US012551987B2

(12) United States Patent
Chen

(10) Patent No.: US 12,551,987 B2
(45) Date of Patent: Feb. 17, 2026

(54) CORNER CLAMP FOR WOODWORKING

(71) Applicant: Chung Li Chen, Taichung (TW)

(72) Inventor: Chung Li Chen, Taichung (TW)

( * ) Notice: Subject to any disclaimer, the term of this patent is extended or adjusted under 35 U.S.C. 154(b) by 365 days.

(21) Appl. No.: 18/381,691

(22) Filed: Oct. 19, 2023

(65) Prior Publication Data

US 2024/0082986 A1 Mar. 14, 2024

(51) Int. Cl.
*B25B 5/14* (2006.01)

(52) U.S. Cl.
CPC .................................... *B25B 5/142* (2013.01)

(58) Field of Classification Search
CPC .................................. B25B 5/142; B25B 5/02
See application file for complete search history.

(56) References Cited

U.S. PATENT DOCUMENTS 2,498,725 A * 2/1950 Thornburg .............. B25B 5/142 269/162
3,682,467 A * 8/1972 Heinrich ................. B25B 5/142 269/41
2007/0284796 A1* 12/2007 Hummel ................. B25B 5/142 269/41
2008/0258368 A1* 10/2008 Kinnison ................ B25B 5/142 269/41
2016/0067845 A1* 3/2016 Quaiz ...................... B25B 5/006 29/559

FOREIGN PATENT DOCUMENTS

WO WO-2021198735 A1 * 10/2021 ............. B25B 5/085

* cited by examiner

*Primary Examiner* — Jason L Vaughan
*Assistant Examiner* — Amanda Kreiling

(57) ABSTRACT

A corner clamp for woodworking includes a clamp body having a carrying seat, the carrying seat having a slide surface with an elongate guide hole and an anti-slip portion; a slider, having a frame-shaped base that includes a guide block, a press portion, an accommodating room and at least one receiving portion having a through hole; a chuck; at least one detent, having a detent body movable in the through hole; and an eccentric pull member, having a first eccentric portion relative to the detent. When the chuck clamps two boards, the eccentric pull member is pulled toward the chuck so that the first eccentric portion presses the detent to be in tight contact with the stop-slip portion to prevent the boards from loosening when the boards are clamped.

9 Claims, 13 Drawing Sheets

10

CORNER CLAMP FOR WOODWORKING

FIELD OF THE INVENTION

The invention relates to corner clamps, and more particularly to a corner clamp for woodworking.

BACKGROUND OF THE INVENTION

When boards (e.g. planks) are assembled to form frames (e.g. wood frames), in order to facilitate fixing (e.g. screw fixing) of the corner where the ends of the boards meet, corner clamps are used for temporarily clamping the connected corner of the boards.

A conventional corner clamp is used for clamping and securing the connected corner of boards temporarily, but the clamping force relies on the rebound force of a compression spring. As a result, when the connected boards are impacted by an external force before the boards are locked, because the chuck has no retreat restriction or has no locking function after the chuck clamps the boards, it is easy for the connecting ends of the boards to deviate or shift due to excessive external force.

SUMMARY OF THE INVENTION

The primary object of the invention is to provide a corner clamp for woodworking. The corner clamp comprises a clamp body, a slider, a chuck, at least one detent, an eccentric pull member, and a slider spring.

The clamp body has a carrying seat. An upper surface of the carrying seat has a slide surface. An elongate guide hole is formed on the slide surface. At least one of both sides of the elongate guide hole is formed with an anti-slip portion on the slide surface. Two sides of one end of the carrying seat are enlarged and have a pair of resting blocks. The other end of the carrying seat extends downward to form a support portion. The pair of resting blocks each have a resting surface on an inner surface thereof. An included angle of 60 degrees to 150 degrees is defined between the resting surfaces of the pair of resting blocks.

The slider has a frame-shaped base that is slidable on the slide surface. The bottom of the frame-shaped base is formed with a guide block that matches the elongate guide hole and is engaged with the bottom edge of the wall of the elongate guide hole. The frame-shaped base has a press portion that is located below the carrying seat and faces the support portion. The frame-shaped base further has a pair of pivot portions and an accommodating room between the pair of pivot portions. A receiving portion is provided on the bottom of at least one of two sides of the accommodating room adjacent to the pivot portions. The receiving portion is formed with a through hole relative to the anti-slip portion.

The chuck is disposed at one end of the frame-shaped base opposite the accommodating room. The chuck has a head. Two sides of the head are respectively formed with clamping surfaces relative to the resting surfaces of the pair of resting blocks. The clamping surfaces are parallel to the resting surfaces.

The detent is disposed on the receiving portion. The detent has a detent body that is movable in the through hole. The bottom of the detent body is formed with a locking surface relative to the anti-slip portion.

The eccentric pull member has a rotating member pivoted to the pair of pivot portions with a pivot rod. An operating portion is formed on one side of the rotating member. At least one of both ends of the eccentric pull member is formed with a first eccentric portion relative to an upper surface of the detent body of the detent. The first eccentric portion is configured to press the detent body to move in the through hole and enables the locking surface to be in tight contact with the anti-slip portion.

One end of the slider spring is pressed against the support portion of the clamp body, and the other end of the slider spring is pressed against the press portion of the slider for pushing the clamping surfaces of the chuck to lean against the resting surfaces of the pair of resting blocks normally.

When the corner clamp is to be used at the corner where the ends of the two boards meet, the chuck on the slider is operated to slide away from the pair of resting blocks of the clamp body, such that a pair of clamping openings for the two boards to be inserted are formed between the chuck and the pair of resting blocks. When the two boards are inserted in the pair of clamping openings, the slider is pushed back by the press portion using the rebound force released by the compression of the slider spring after the slider is slid, so that the resting surfaces of the pair of resting blocks and the clamping surfaces on both sides of the head of the chuck together clamp the two boards. The operating portion of the eccentric pull member pulls the first eccentric portion toward the chuck to press the detent body of the detent. The non-slip effect generated by the locking surface of the bottom of the detent body to be in tight contact with the non-slip surface restricts the slider from sliding on the slide surface of the clamp body. Thus, the resting surfaces of the pair of resting blocks and the clamping surfaces of the chuck work together to clamp the two boards, so as to achieve the effect of preventing loosening when the ends of the two boards are connected and temporarily clamped.

Preferably, the clamp body further has a notch at the position where the elongate guide hole meets the support portion. A pair of engaging gaps are formed at the junction of the notch and the wall of the elongated guide hole. Two sides of the bottom of the guide block of the slider are formed with a pair of engaging portions relative to the engaging gaps. For assembly, the slider is turned, with the press portion being parallel to the elongate guide hole, and then the press portion is inserted and swiveled after passing through the elongate guide hole. The guide block is inserted and moved forward toward the notch. The engaging portions are engaged with the bottom edge of the wall of the elongate guide hole via the engaging gaps, so that the slider can be easily and slidably connected to the carrying seat of the clamp body.

Preferably, the press portion of the slider is formed with a neck corresponding in width to the elongate guide hole of the clamp body. The slider can assist the guide block to be positioned in the elongate guide hole via the neck to jointly generate displacement guidance, so as to reduce or avoid the slide offset phenomenon when the slider slides on the slide surface of the carrying seat.

Preferably, the included angle between the resting surfaces of the pair of resting blocks of the clamp body is 90 degrees. When the ends of the two boards meet vertically, the corner clamp is used for clamping and securing the two boards at the vertically connected corner of the two boards.

Preferably, a curved groove is formed on the receiving portion of the slider. The curved groove is provided with a resilient member at a position separated from the through hole. One end of the detent body of the detent has a pivotal portion mounted on the curved groove for swinging. The other end of the detent body of the detent has a push portion that rests on the elastic member. The elastic member pushes the push portion so that the locking surface is normally away from the anti-slip portion on the slide surface of the clamp body. When the eccentric pull member is pulled toward the chuck, the first eccentric portion presses the detent body of the detent to swing downward, such that the locking surface is in tight contact with the stop-slip portion, and the slider won't slide on the slide surface. On the contrary, when the eccentric pull member is pulled back, the resilient force of the elastic member pushes back the locking surface of the detent away from the anti-slip portion, thereby releasing the sliding restriction of the slider on the slide surface. The non-slip portion on the slide surface of the clamp body is a toothed surface having a plurality of teeth arranged in parallel. The locking surface of the detent is a toothed surface having teeth corresponding in shape and in space width to the teeth of the anti-slip portion. When the locking surface is in tight contact with the anti-slip portion, the teeth of the locking surface mesh with part of the teeth of the anti-slip portion, so as to enhance the non-slip capability of the slider on the slide surface.

Preferably, anti-slip soft rubber pads are provided on the resting surfaces of the resting blocks at one end of the carrying seat of the clamp body and the clamping surfaces on the two sides of the head of the chuck, respectively. Outer surfaces of the anti-slip soft rubber pads are defined as the resting surfaces and the clamping surfaces. The damping and anti-slip properties of the anti-slip soft rubber pads, increase the ability to stop slippage when the resting surfaces of the pair of the resting blocks and the clamping surfaces of the chuck work together to clamp or lock the boards.

Preferably, a protrusion and a recess are provided on the support portion of the clamp body and the press portion of the slider for mounting the slider spring. The protrusion and the recess are interchangeable with each other. When one end of the slider spring is pressed against the support portion and the other end of the slider spring is pressed against the press portion, the protrusion and the recess restrict the radial retraction of the slider spring. The stability of the slider spring is increased when the press portion is moved close to or away from the support portion.

Preferably, the end of the frame-shaped base of the slider, opposite to the accommodating room, forms a platform portion that is separated by a retaining wall. The retaining wall has a doorway that allows the platform portion to communicate with the accommodating room. A guide part is provided on a surface of the platform portion corresponding to the doorway. The chuck has an extension section extending from one end of the head. The extension section is placed on the surface of the platform portion and inserted into the accommodating room via the doorway. The guide part is accommodated in the extension section, so that the chuck is guided by the guide part, enabling the head of the chuck to move close to/or away from the retaining wall on the platform portion. A chunk spring is provided in the extension section. One end of the chuck spring is pressed against the guide part, and the other end of the chuck spring is pressed against an inner surface of the extension section, thereby pushing the head to approach the retaining wall normally. A second eccentric portion is provided on one side of the rotating member of the eccentric pull member. The second eccentric portion is normally away from one end face of the extension section. After the eccentric pull member is pulled toward the chuck, the second eccentric portion is pushed against the end face of the extension section. When the pair of resting blocks and the chuck work together to clamp the boards, the eccentric pull member is pulled toward the chuck, such that the first eccentric portion presses the detent to restrict the slider from sliding on the slide surface, and the second eccentric portion pushes against the end face of the extension section of the chuck, causing the chuck to generate forward movement energy. Thus, the clamping surfaces of the chuck form a tightening effect on the surfaces of the boards, thereby increasing the stability of the corner clamp to clamp the boards.

DETAILED DESCRIPTION OF THE PREFERRED EMBODIMENTS

Figure 1:
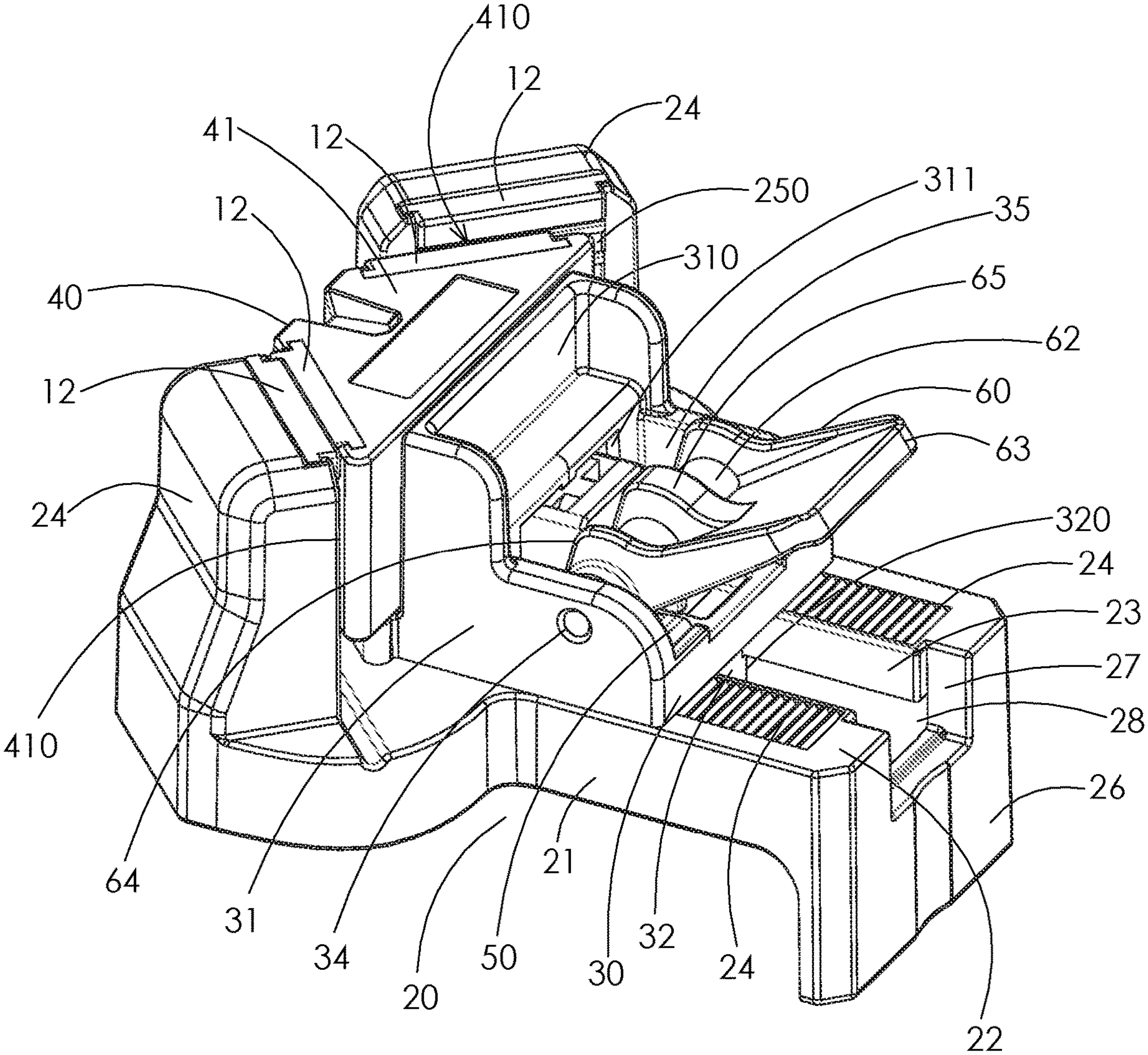
FIG. 1 is a perspective view of the invention.

Embodiments of the invention will now be described, by way of example only, with reference to the accompanying drawings.

As shown in FIG. 1 through FIG. 6, the invention discloses a corner clamp 10 for woodworking, comprising a clamp body 20, a slider 30, a chuck 40, at least one detent 50, an eccentric pull member 60, and a slider spring 70.

The clamp body 20 has a carrying seat 21. An upper surface of the carrying seat 21 has a slide surface 22. An elongate guide hole 23 is formed on the slide surface 22. At least one of both sides of the elongate guide hole 23 is formed with an anti-slip portion 24 on the slide surface 22. As shown in the figures, a pair of anti-slip portions 24 are formed on both sides of the elongate guide hole 23. Two ends of one end of the carrying seat 21 are enlarged and have a pair of resting blocks 25. The other end of the carrying seat 21 extends downward to form a support portion 26. The pair of resting blocks 25 each have a resting surface 250 on an inner surface thereof. An included angle α of 60 degrees to 150 degrees is defined between the resting surfaces 250 of the pair of resting blocks 25.

The slider 30 has a frame-shaped base 31 that is slidable on the slide surface 22. The bottom of the frame-shaped base 31 is formed with a guide block 32 that matches the elongate guide hole 23 and is engaged with the bottom edge of the wall of the elongate guide hole 23. The frame-shaped base 31 has a press portion 33 that is located below the carrying seat 21 and faces the support portion 26. The frame-shaped base 31 further has a pair of pivot portions 34 and an accommodating room 35 between the pair of pivot portions 34. A receiving portion 36 is provided on the bottom of at least one of two sides of the accommodating room 35 adjacent to the pivot portions 34. As shown in the figures, the receiving portion 36 is provided at the bottom of either side of accommodating room 35. The receiving portion 36 is formed with a through hole 37 relative to the anti-slip portion 24.

The chuck 40 is disposed at one end of the frame-shaped base 31 opposite the accommodating room 35. The chuck 40 has a head 41. Two sides of the head 41 are respectively formed with clamping surfaces 410 relative to the resting surfaces 250 of the pair of resting blocks 25. The clamping surfaces 410 are parallel to the resting surfaces 250.

The detent 50 is disposed on the receiving portion 36. As shown in the figures, two detents 50 are disposed on the receiving portions 36, respectively. The detent 50 has a detent body 51 that is movable in the through hole 37. The bottom of the detent body 51 is formed with a locking surface 52 relative to the anti-slip portion 24.

The eccentric pull member 60 has a rotating member 62 pivoted to the pair of pivot portions 34 with a pivot rod 61. An operating portion 63 is formed on one side of the rotating member 62. At least one of both ends of the eccentric pull member 60 is formed with a first eccentric portion 64 relative to an upper surface of the detent body 51 of the detent 50. The first eccentric portion corresponds in number and in position to the detent. As shown in the figures, a pair of first eccentric portions 64 are provided on two ends of the eccentric pull member 60. The first eccentric portion 64 presses the detent body 51 to move in the through hole 37 and enables the locking surface 52 to be in tight contact with the anti-slip portion 24.

One end of the slider spring 70 is pressed against the support portion 26 of the clamp body 20, and the other end of the slider spring 70 is pressed against the press portion 33 of the slider 30 for pushing the clamping surfaces 410 of the chuck 40 to lean against the resting surfaces 250 of the pair of resting blocks 25 normally.

Figure 7:
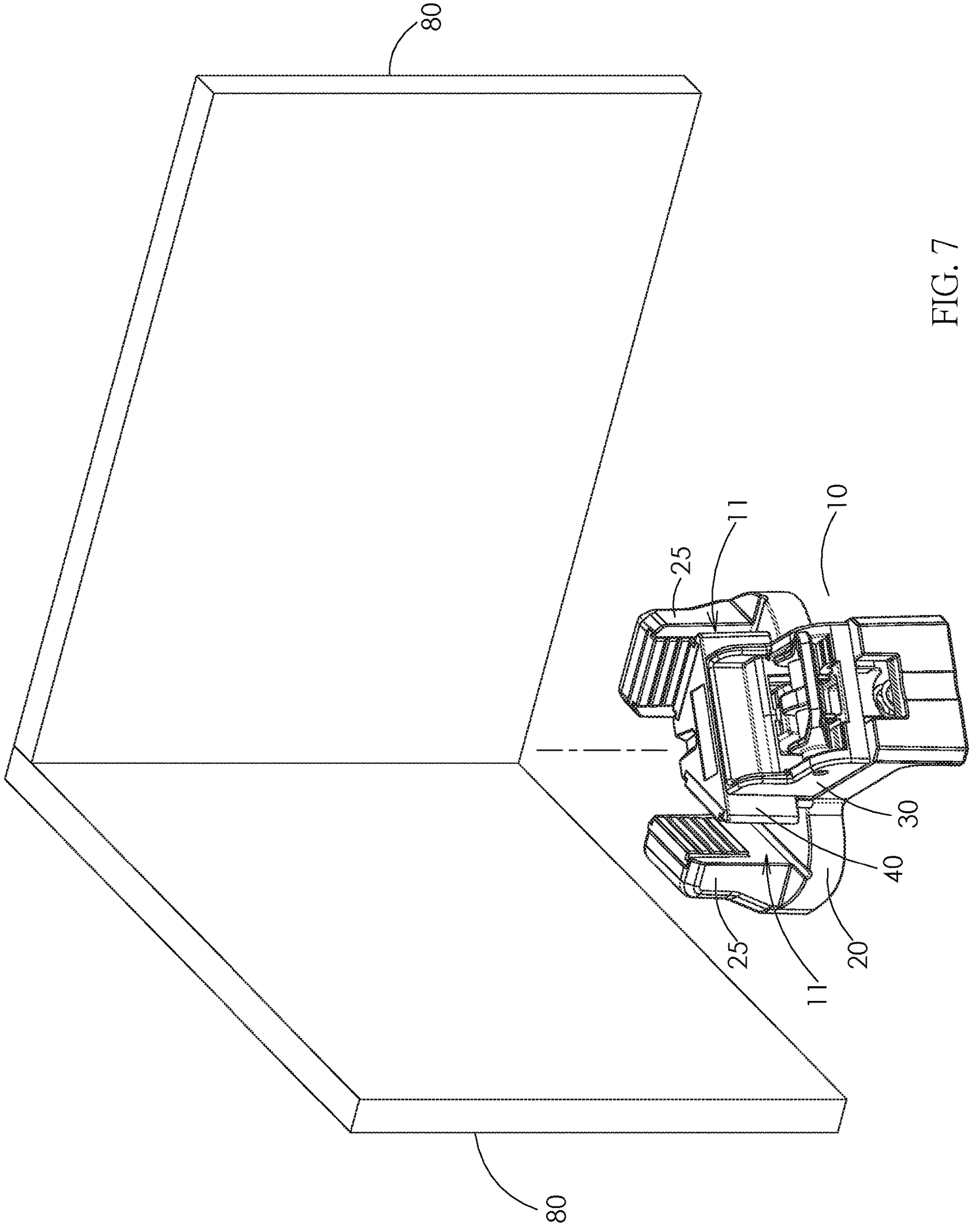
FIG. 7 is a schematic view of the invention used for clamping the connected corner of two boards.
Figure 8:
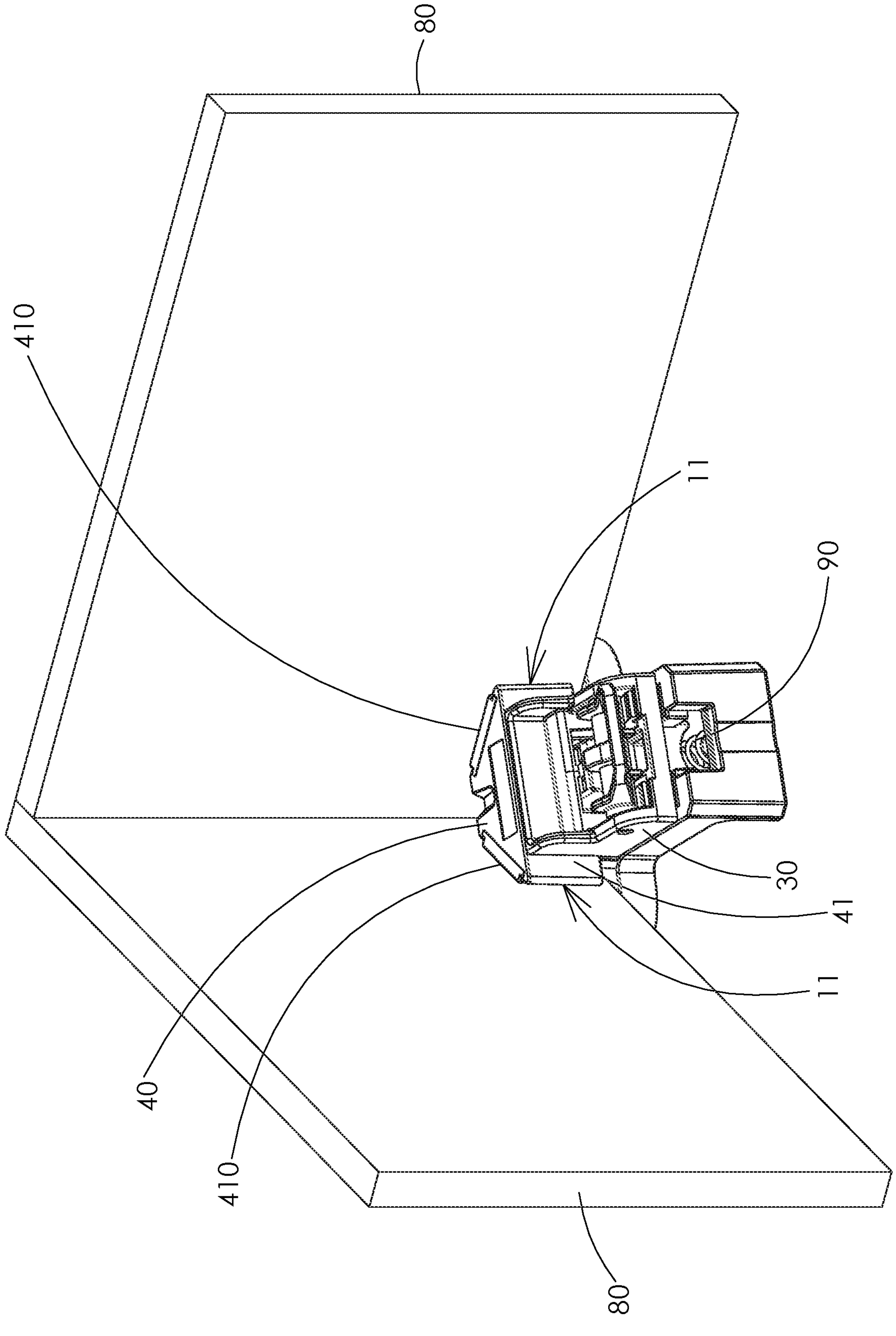
FIG. 8 is a schematic view of the invention when in use, wherein the connected corner of two boards is clamped by the corner clamp.
Figure 9:
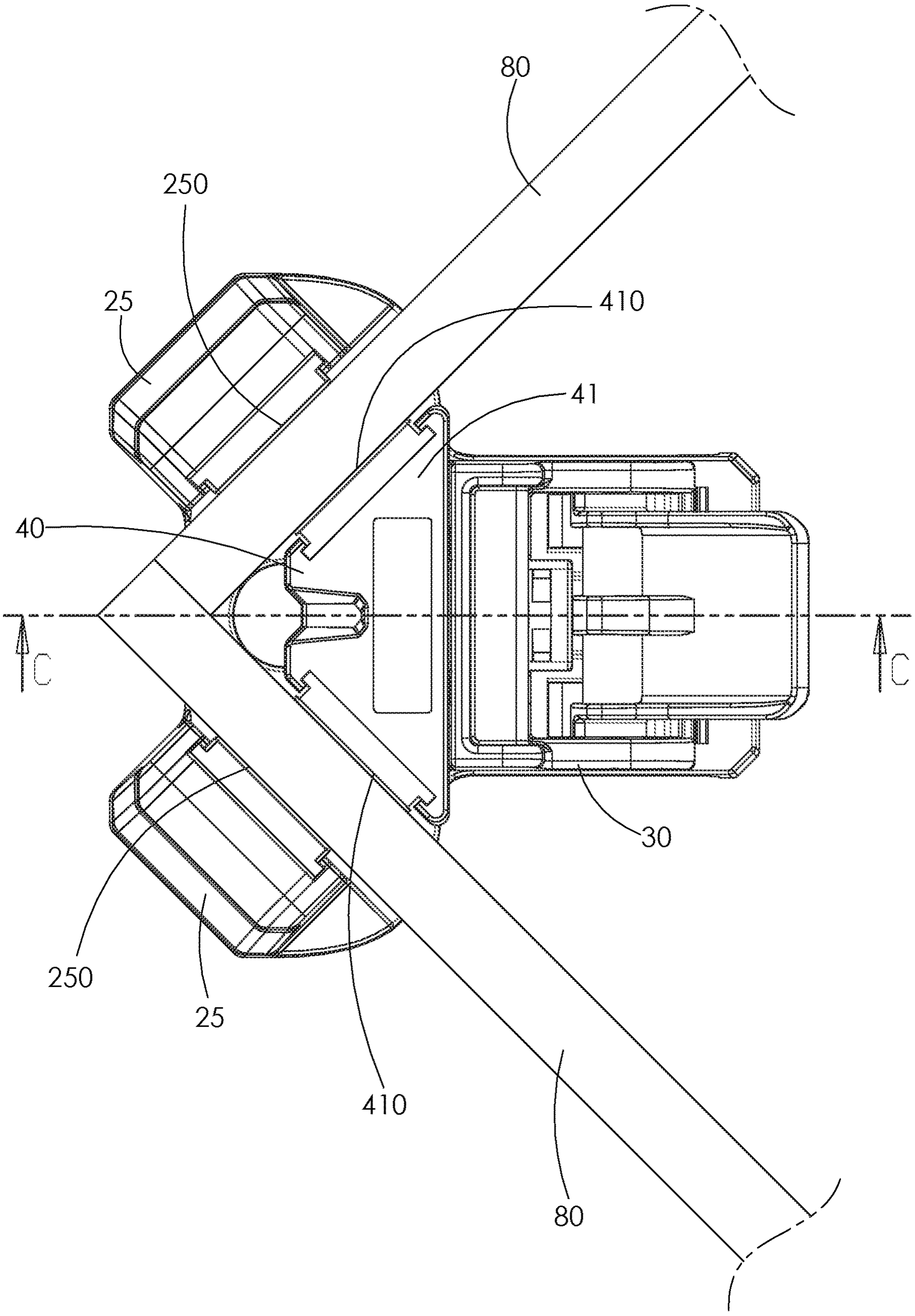
FIG. 9 is a top view of FIG. 8.
Figure 10:
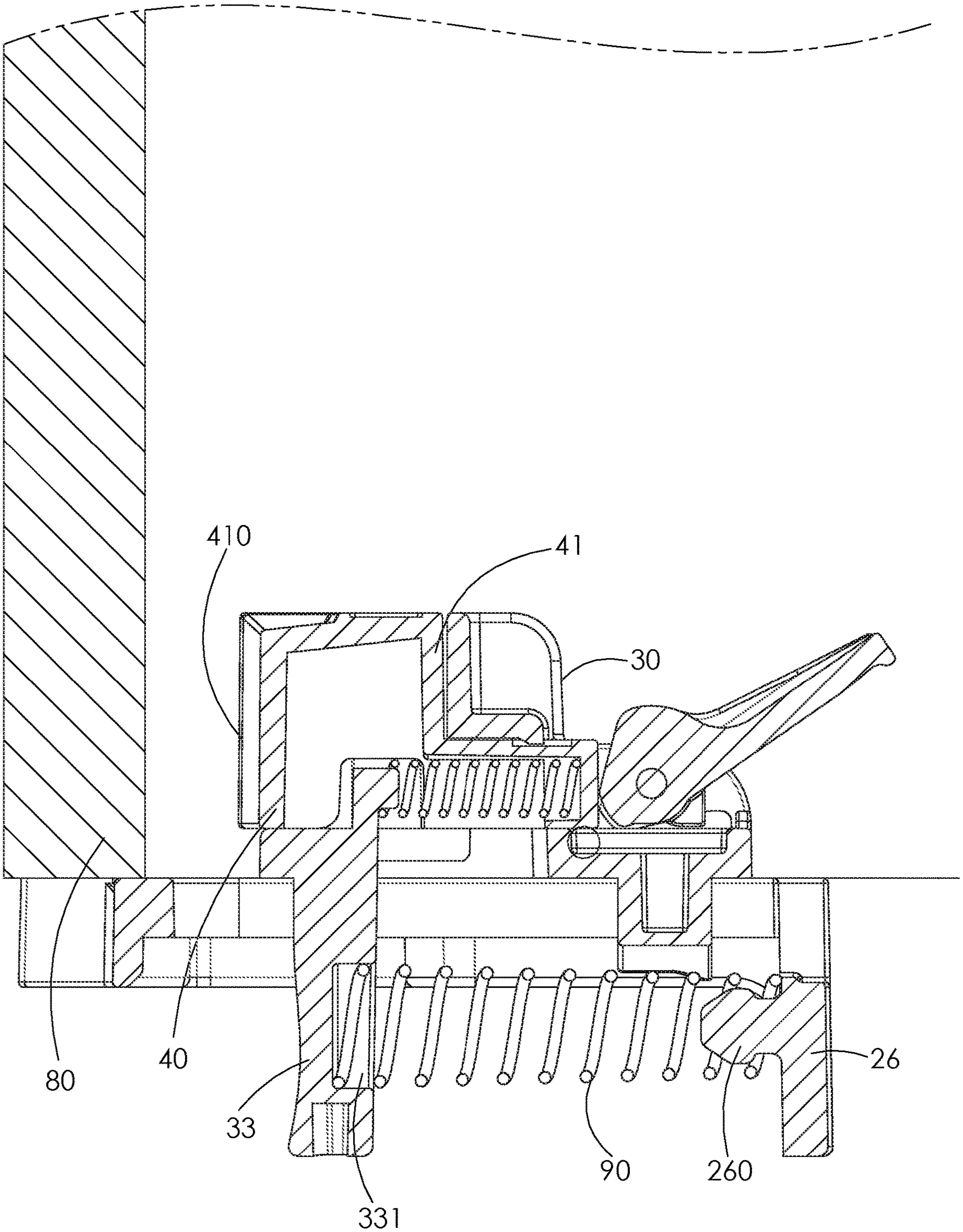
FIG. 10 is a cross-sectional view taken along line C-C of FIG. 9.
Figure 11:
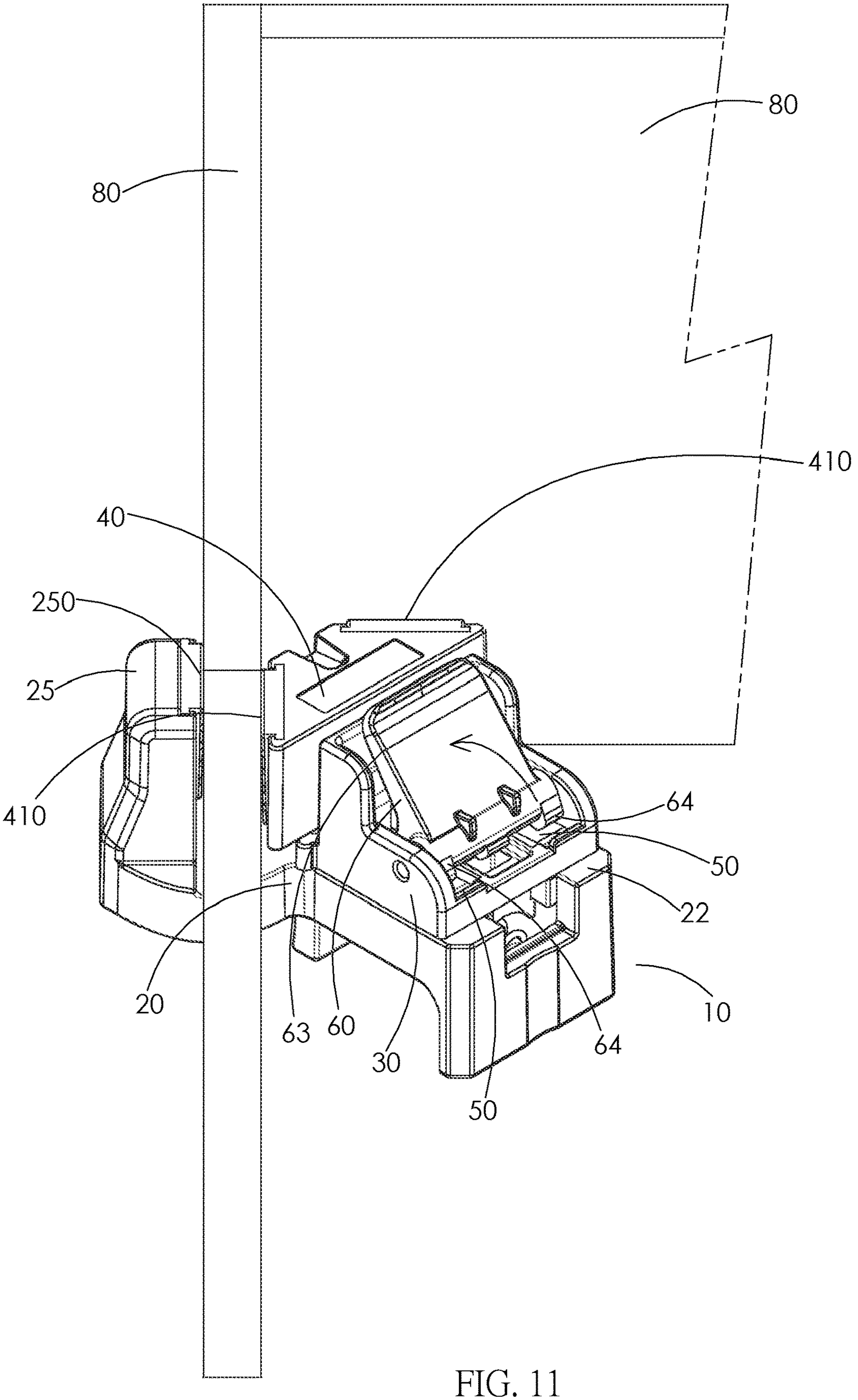
FIG. 11 is a schematic view of the invention when in use, wherein the corner clamp is in a locked state.
Figure 12:
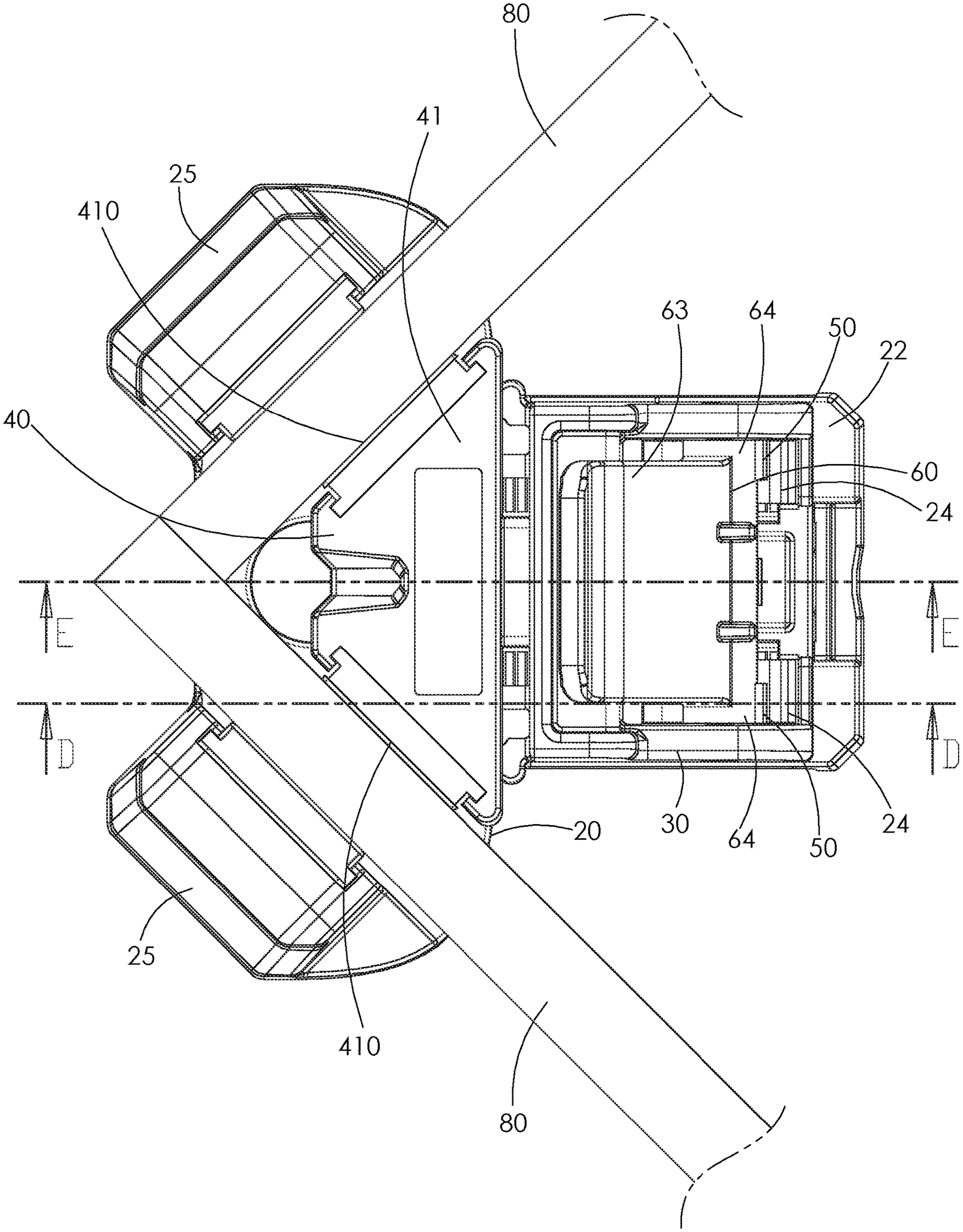
FIG. 12 is a top view of FIG. 11.
Figure 13:
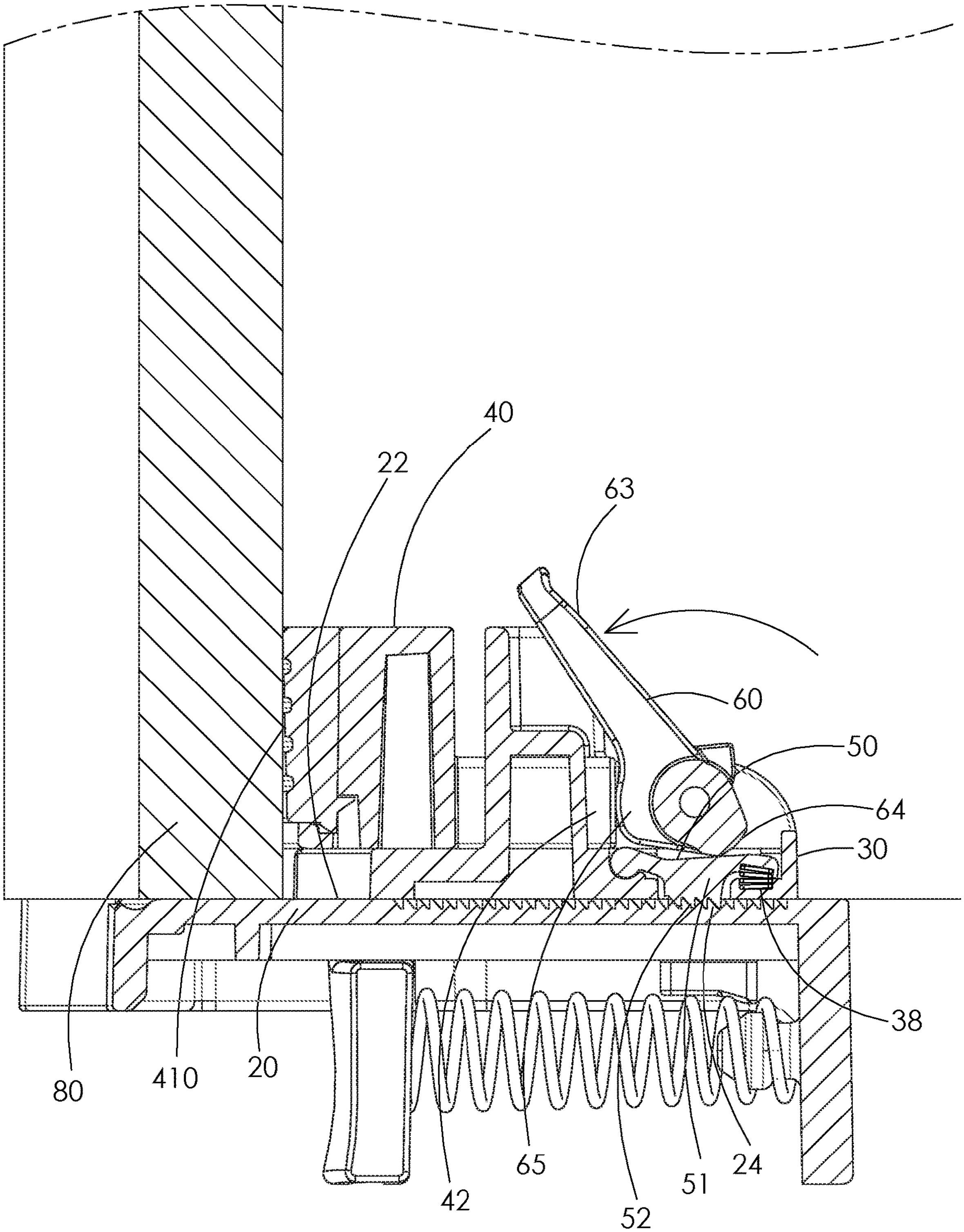
FIG. 13 is a cross-sectional view taken along line D-D of FIG. 12.
Figure 14:
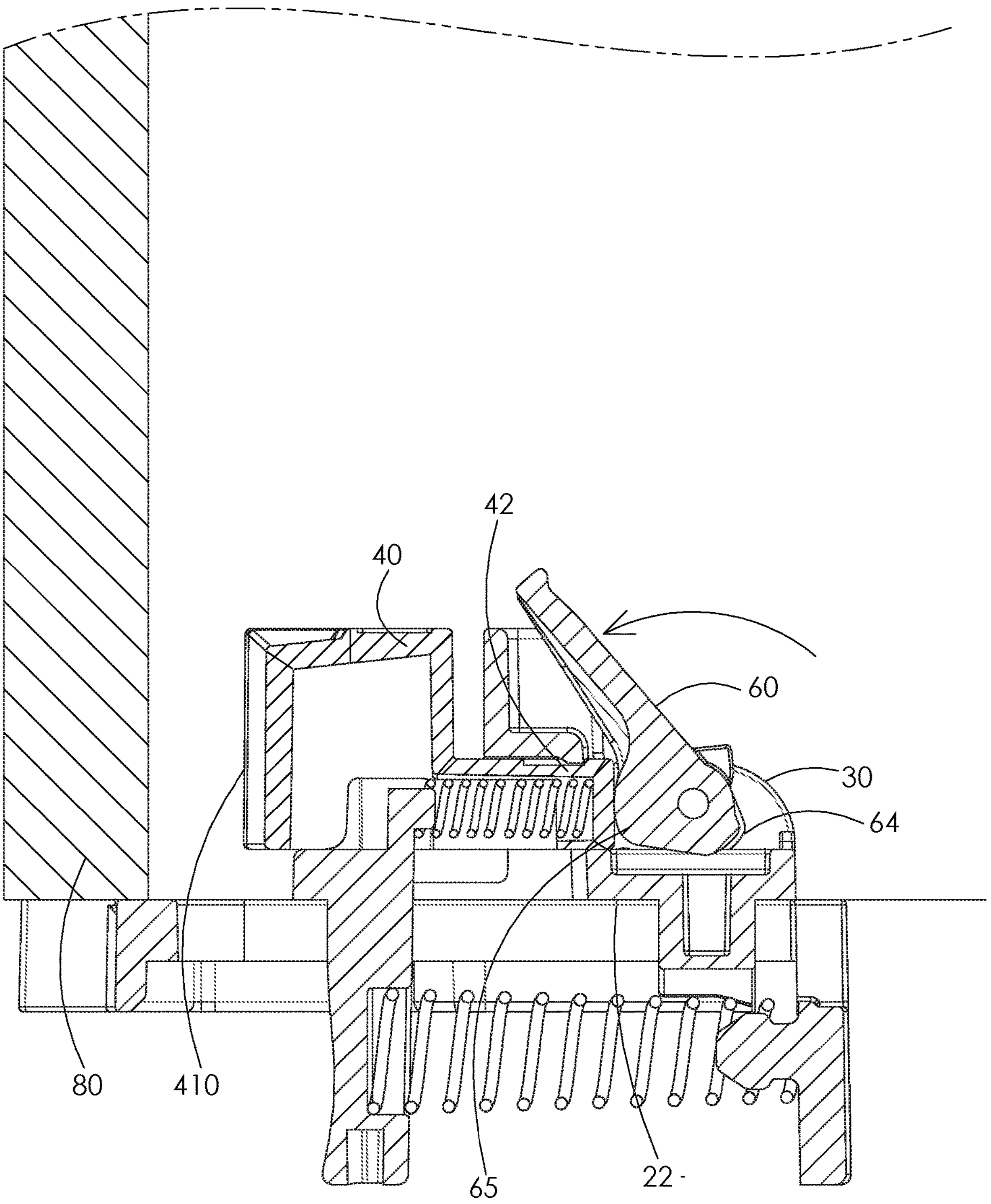
FIG. 14 is a cross-sectional view taken along line E-E of FIG. 12.

As shown in FIG. 7, when the corner clamp 10 is to be used at the corner where the ends of the two boards 80 meet, the chuck 40 on the slider 30 is operated to slide away from the pair of resting blocks 25 of the clamp body 20, such that a pair of clamping openings 11 for the two boards 80 to be inserted is formed between the chuck 40 and the pair of resting blocks 25. As shown in FIG. 8, FIG. 9 and FIG. 10, when the two boards 80 are inserted in the pair of clamping openings 11, the slider 30 is pushed back by the press portion 33 using the rebound force released by the compression of the slider spring 70 after the slider 30 is slid, so that the resting surfaces 250 of the pair of resting blocks 25 and the clamping surfaces 410 on both sides of the head 41 of the chuck 40 together clamp the two boards 80. As shown in FIG. 11, FIG. 12 and FIG. 13, the operating portion 63 of the eccentric pull member 60 pulls the first eccentric portion 64 toward the chuck 40 to press the detent body 51 of the detent 50. The non-slip effect generated by the locking surface 52 of the bottom of the detent body 51 to be in tight contact with the non-slip surface 24 restricts the slider 30 from sliding on the slide surface 22 of the clamp body 20. Thus, the resting surfaces 250 of the pair of resting blocks 25 and the clamping surfaces 410 of the chuck 40 work together to clamp the two boards 80, so as to achieve the effect of preventing loosening when the ends of the two boards 80 are connected and temporarily clamped.

According to the above embodiment, preferably, as shown in FIG. 1, FIG. 2, FIG. 5 and FIG. 6, the clamp body 20 further has a U-shaped notch 27 at the position where the elongate guide hole 23 meets the support portion 26. A pair of engaging gaps 28 are formed at the junction of the notch 27 and the wall of the elongated guide hole 23. Two sides of the bottom of the guide block 32 of the slider 30 are formed with a pair of engaging portions 320 relative to the engaging gaps 28. For assembly, the slider 30 is turned, with the press portion 33 being parallel to the elongate guide hole 23 (not shown in the figures), and then the press portion 33 is inserted and swiveled after passing through the elongate guide hole 23. The guide block 32 is inserted and moved forward toward the notch 27. The engaging portions 320 are engaged with the bottom edge of the wall of the elongate guide hole 23 via the engaging gaps 28, so that the slider 30 can be easily and slidably connected to the carrying seat 21 of the clamp body 20.

Figure 2:
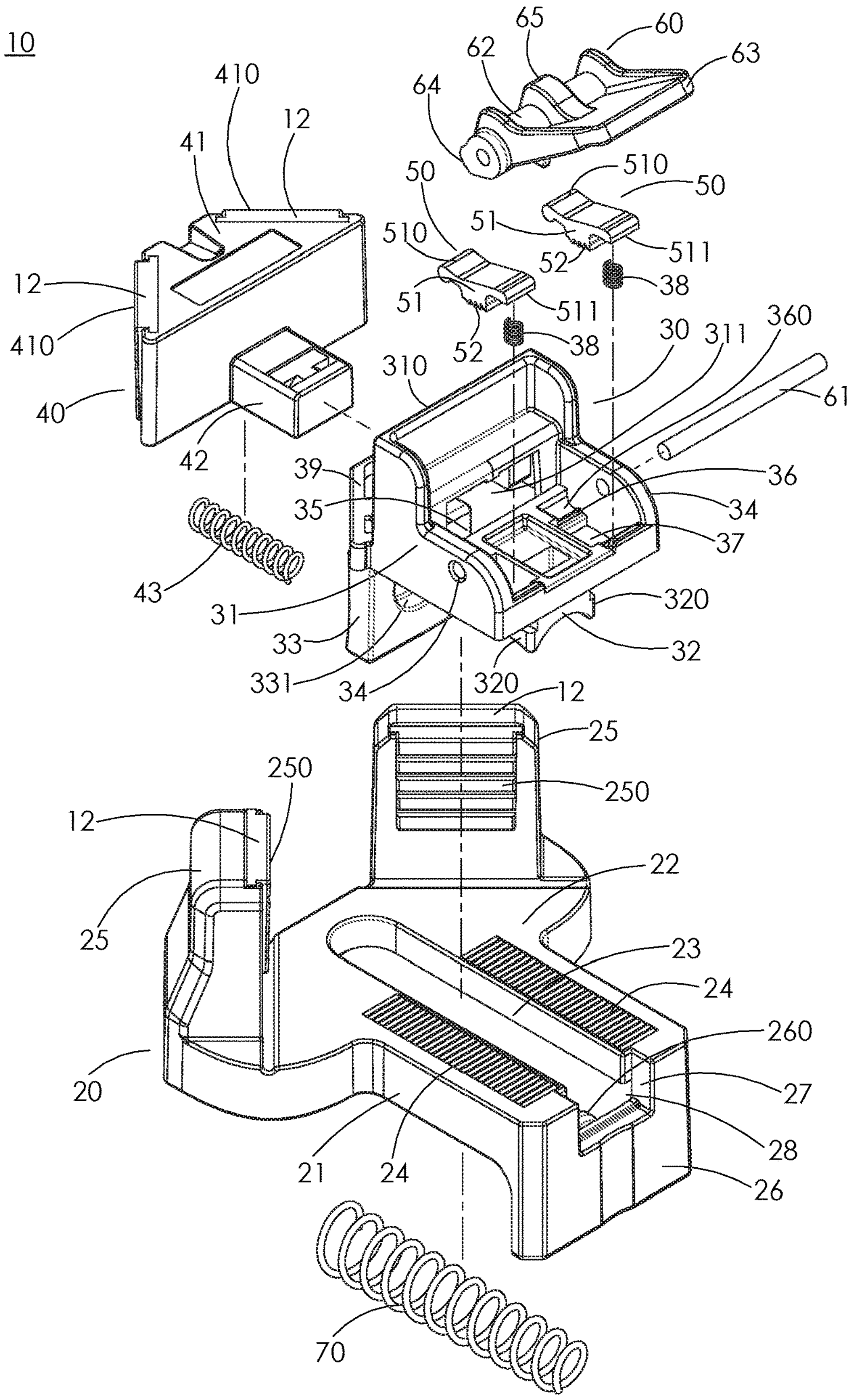
FIG. 2 is an exploded view of the invention.
Figure 3:
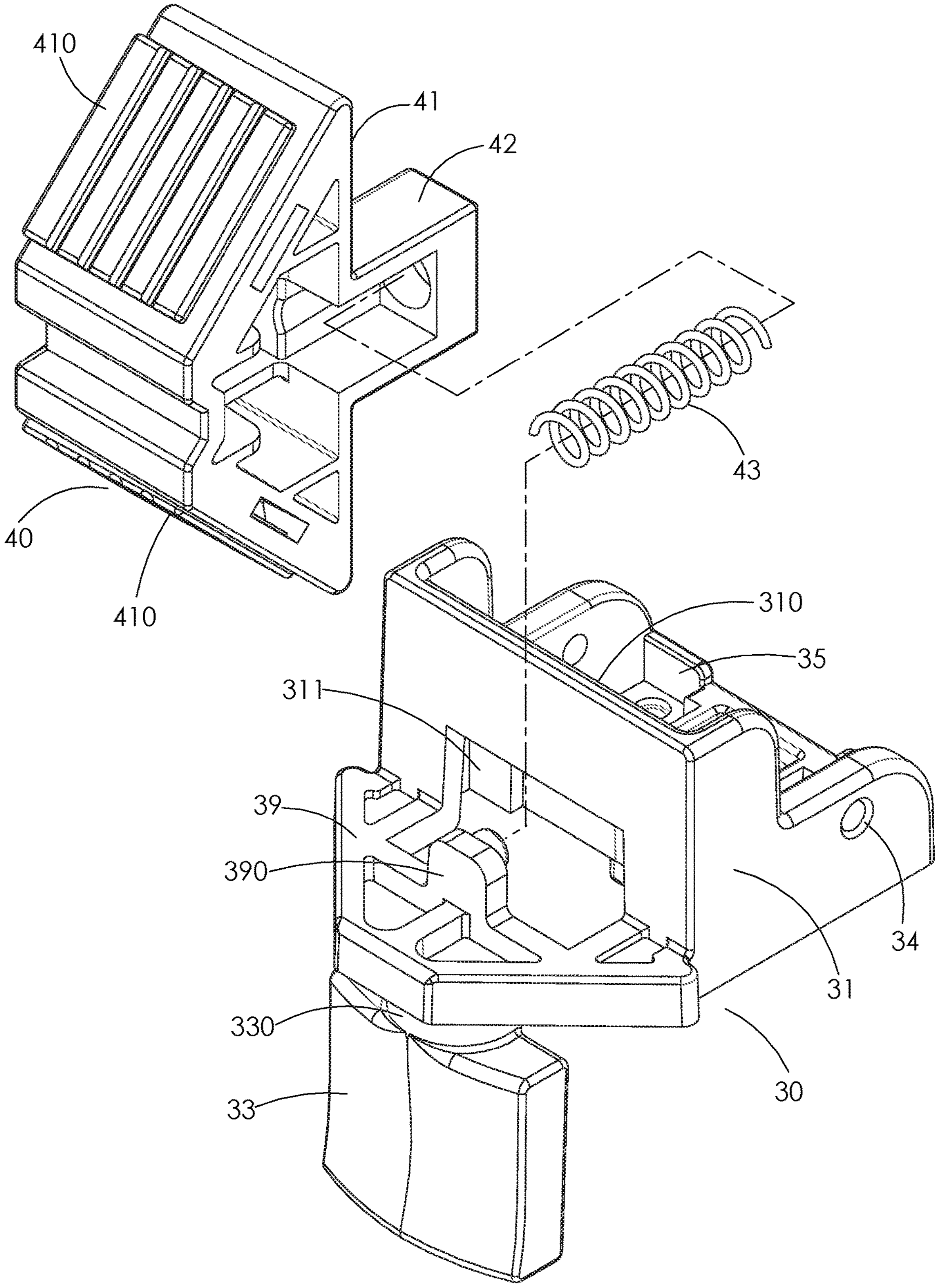
FIG. 3 is an exploded view of the chuck and the slider of the invention.
Figure 6:
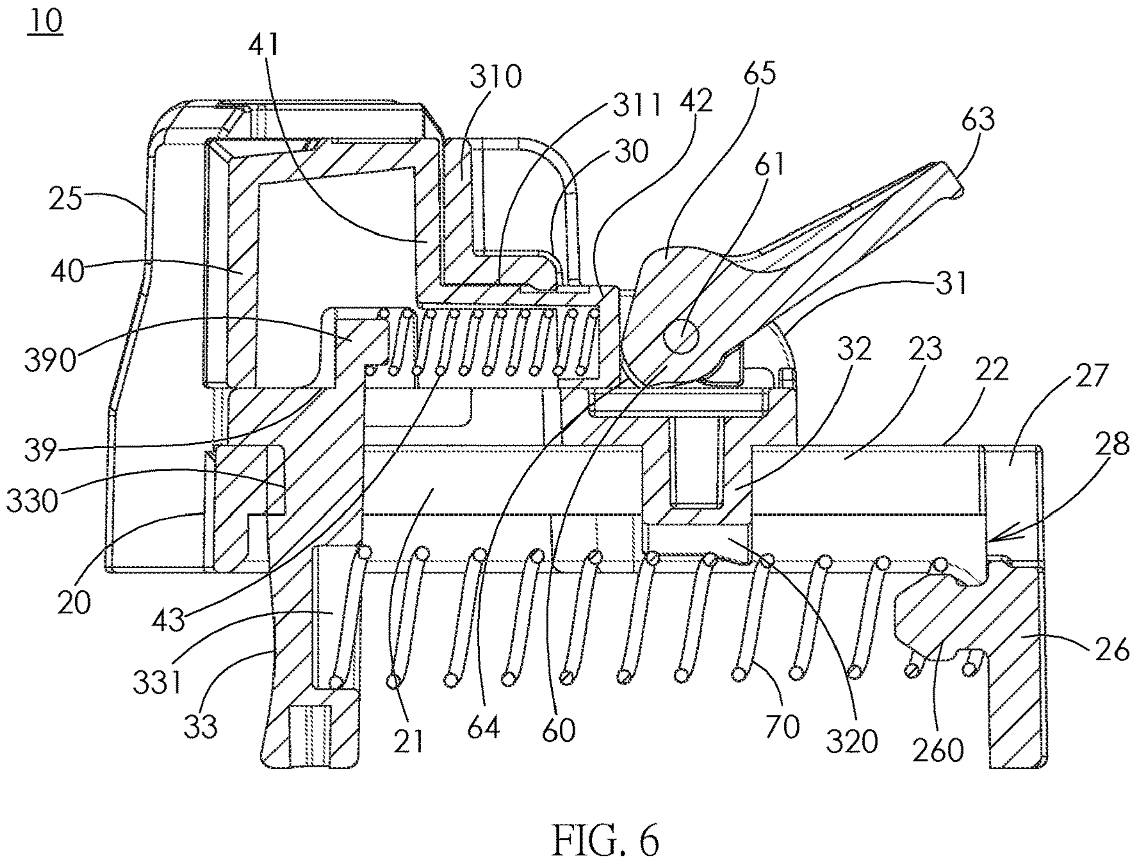
FIG. 6 is a cross-sectional view taken along line B-B of FIG. 4.

According to the above embodiment, preferably, as shown in FIG. 2, FIG. 3 and FIG. 6, the press portion 33 of the slider 30 is formed with a neck 330 corresponding in width to the elongate guide hole 23 of the clamp body 20. The slider 30 can assist the guide block 32 to be positioned in the elongate guide hole 23 via the neck 330 to jointly generate displacement guidance, so as to reduce or avoid the slide offset phenomenon when the slider 30 slides on the slide surface 22 of the carrying seat 21.

Figure 4:
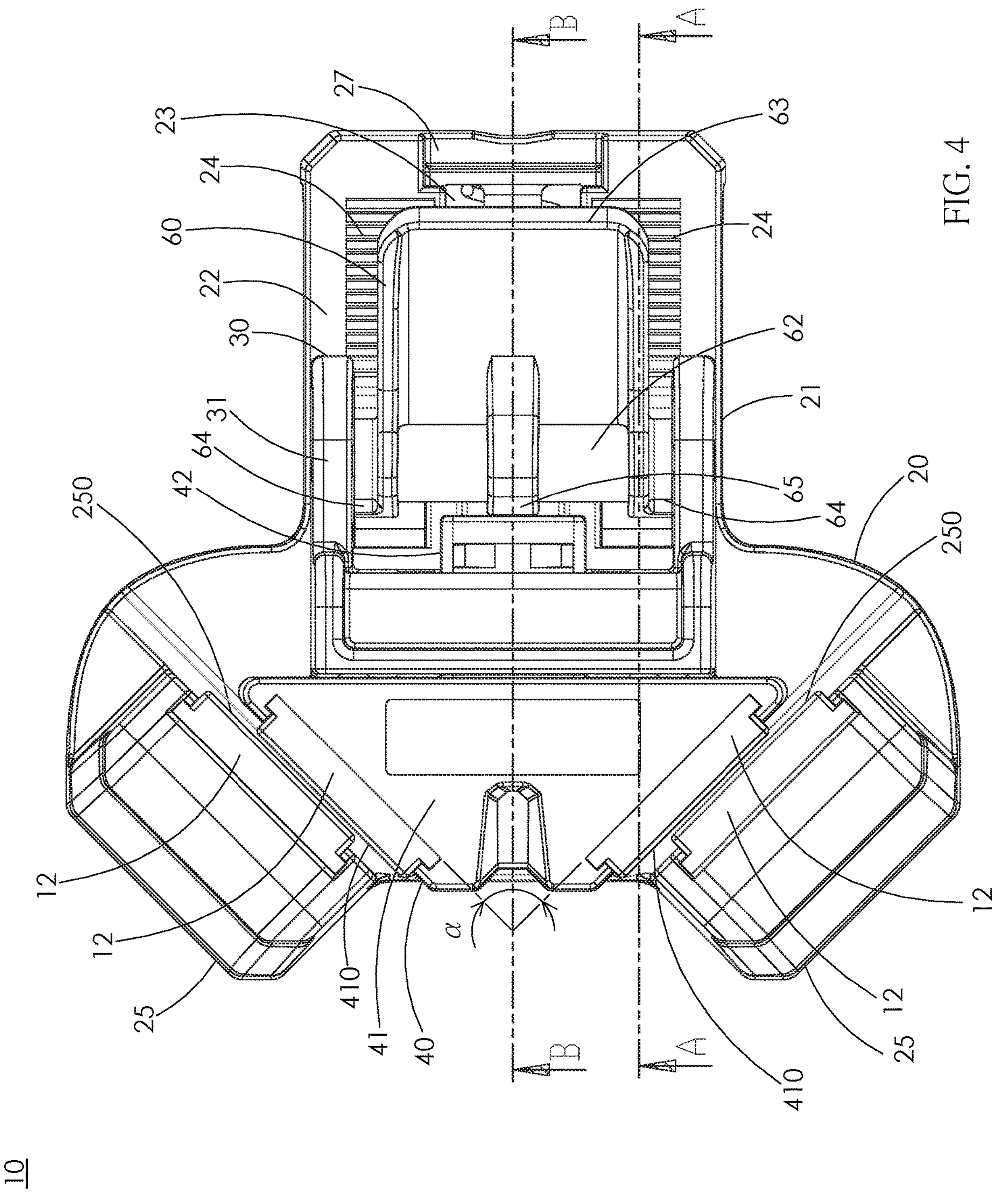
FIG. 4 is a top view of the invention.

According to the above embodiment, preferably, as shown in FIG. 2 and FIG. 4, the included angle $\alpha$ between the resting surfaces 250 of the pair of resting blocks 25 of the clamp body 20 is 90 degrees. As shown in FIG. 7, FIG. 8 and FIG. 11, when the ends of the two boards 80 meet vertically, the corner clamp 10 is used for clamping and securing the two boards 80 at the vertically connected corner of the two boards 80.

Figure 5:
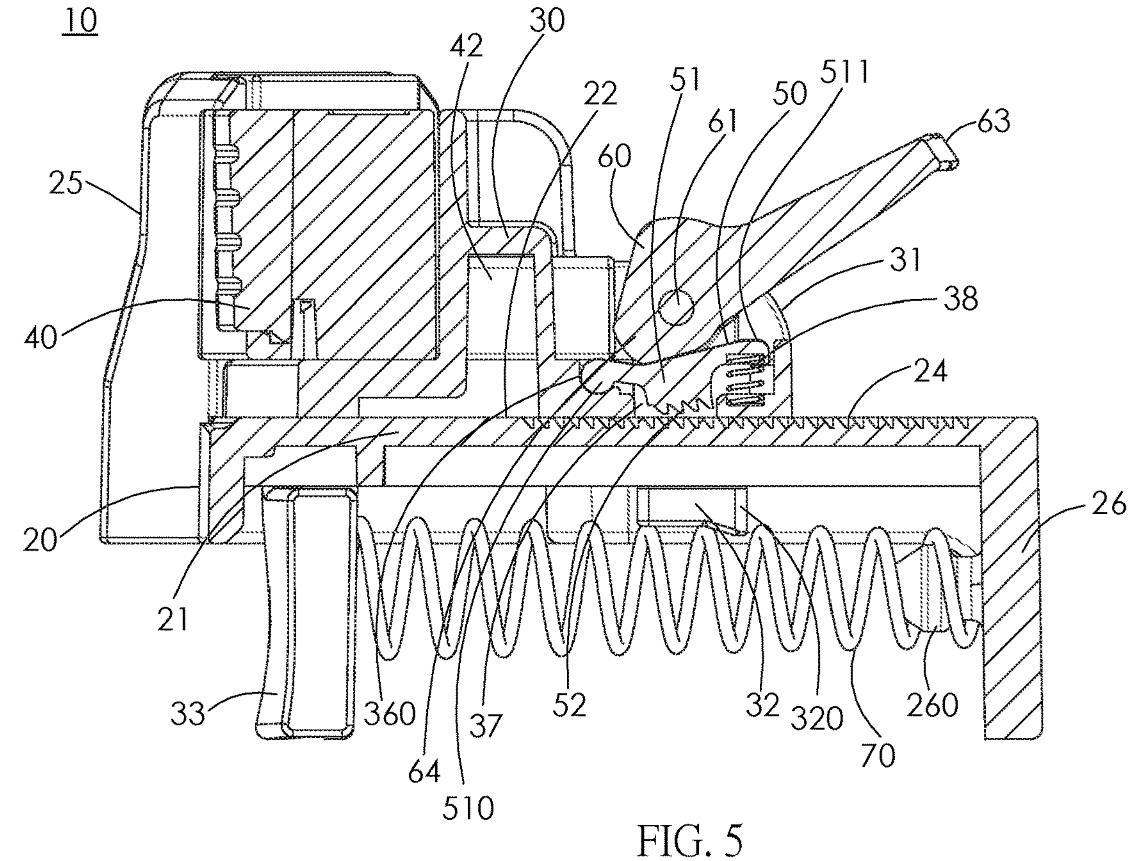
FIG. 5 is a cross-sectional view taken along line A-A of FIG. 4.

According to the above embodiment, preferably, as shown in FIG. 2 and FIG. 5, a curved groove 360 is formed on the receiving portion 36 of the slider 30. The curved groove 360 is provided with a resilient member 38 (preferably, a small compression spring) at a position separated from the through hole 37 supported by a concave hole. One end of the detent body 51 of the detent 50 has a pivotal portion 510 mounted on the curved groove 360 for swinging. The other end of the detent body 51 of the detent 50 has a push portion 511 that rests on an actuating end of the elastic member 38. The elastic member 38 pushes the push portion 511 so that the locking surface 52 is normally away from the anti-slip portion 24 on the slide surface 22 of the clamp body 20. As shown in FIG. 11 and FIG. 13, when the eccentric pull member 60 is pulled toward the chuck 40, the first eccentric portion 64 presses the detent body 51 of the detent 50 to swing downward, such that the locking surface 52 is in tight contact with the stop-slip portion 24, and the slider 30 won't slide on the slide surface 22. On the contrary, when the eccentric pull member 60 is pulled back (in the opposite direction of the arrow in FIG. 13), the resilient force of the elastic member 38 pushes back the locking surface 52 of the detent 50 away from the anti-slip portion 24 as shown in FIG. 5, thereby releasing the sliding restriction of the slider 30 on the slide surface 22. As shown in FIG. 2 and FIG. 5, the non-slip portion 24 on the slide surface 22 of the clamp body 20 is a toothed surface having a plurality of teeth arranged in parallel. The locking surface 52 of the detent 50 is a toothed surface having teeth corresponding in shape and in space width to the teeth of the anti-slip portion 24. As shown in FIG. 13, when the locking surface 52 is in tight contact with the anti-slip portion 24, the teeth of the locking surface 52 mesh with part of the teeth of the anti-slip portion 24, so as to enhance the non-slip capability of the slider 30 on the slide surface 22.

According to the above embodiment, preferably, as shown in FIG. 1 and FIG. 2, anti-slip soft rubber pads 12 are provided on the resting surfaces 250 of the resting blocks 25 at one end of the carrying seat 21 of the clamp body 20 and the clamping surfaces 410 on the two sides of the head 41 of the chuck 40, respectively. Outer surfaces of the anti-slip soft rubber pads 12 are defined as the resting surfaces 250 and the clamping surfaces 410. The damping and anti-slip properties of the anti-slip soft rubber pads 12, as shown in FIG. 11, increase the ability to stop slippage when the resting surfaces 250 of the pair of the resting blocks 25 and the clamping surfaces 410 of the chuck 40 work together to clamp or lock the boards 80.

According to the above embodiment, preferably, as shown in FIG. 2 and FIG. 6, a protrusion 260 and a recess 331 are provided on the support portion 26 of the clamp body 20 and the press portion 33 of the slider 30 for mounting the slider spring 70. The protrusion 260 and the recess 331 are interchangeable with each other. When one end of the slider spring 70 is pressed against the support portion 26 and the other end of the slider spring 70 is pressed against the press portion 33, the protrusion 260 and the recess 331 restrict the radial retraction of the slider spring 70. As shown in FIG. 6 and FIG. 10, the stability of the slider spring 70 is increased when the press portion 33 is moved close to or away from the support portion 26.

According to the above embodiment, preferably, as shown in FIG. 1, FIG. 2, FIG. 3, FIG. 4 and FIG. 6, the end of the frame-shaped base 31 of the slider 30, opposite to the accommodating room 35, forms a platform portion 39 that is separated by a retaining wall 310. The retaining wall 310 has a doorway 311 that allows the platform portion 39 to communicate with the accommodating room 35. A guide part 390 is provided on a surface of the platform portion 39 corresponding to the doorway 311. The chuck 40 has an extension section 42 extending from one end of the head 41. The extension section 42 is placed on the surface of the platform portion 39 and inserted into the accommodating room 35 via the doorway 311. The guide part 390 is accommodated in the extension section 42, so that the chuck 40 is guided by the guide part 390, enabling the head 41 of the chuck 40 to move close to/or away from the retaining wall 310 on the platform portion 39. A chunk spring 43 is provided in the extension section 42. One end of the chuck spring 43 is pressed against the guide part 390, and the other end of the chuck spring 43 is pressed against an inner surface of the extension section 42, thereby pushing the head 41 to approach the retaining wall 310 normally. A second eccentric portion 65 is provided on one side of the rotating member 62 of the eccentric pull member 60. The second eccentric portion 65 is normally away from one end face of the extension section 42. After the eccentric pull member 60 is pulled toward the chuck 40, the second eccentric portion 65 is pushed against the end face of the extension section 42. As shown in FIG. 8, FIG. 9 and FIG. 10, when the pair of resting blocks 25 and the chuck 40 work together to clamp the boards 80, the eccentric pull member 60 is pulled toward the chuck 40, as shown in FIG. 11, FIG. 12, FIG. 13 and FIG. 14, such that the first eccentric portion 64 presses the detent 50 to restrict the slider 30 from sliding on the slide surface 22, and the second eccentric portion 65 pushes against the end face of the extension section 42 of the chuck 40, causing the chuck 40 to generate forward movement energy. Thus, the clamping surfaces 410 of the chuck 40 form a tightening effect on the surfaces of the boards 80, thereby increasing the stability of the corner clamp 10 to clamp the boards 80.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A corner clamp for woodworking, comprising:

a clamp body having a carrying seat, an upper surface of the carrying seat having a slide surface, an elongate guide hole being formed on the slide surface, at least one of two sides of the elongate guide hole being formed with an anti-slip portion on the slide surface, two sides of one end of the carrying seat being enlarged and having a pair of resting blocks, another end of the carrying seat extending downward to form a support portion, the pair of resting blocks each having a resting surface on an inner surface thereof, an included angle of 60 degrees to 150 degrees being defined between the resting surfaces of the pair of resting blocks;

a slider, having a frame-shaped base that is slidable on the slide surface, a bottom of the frame-shaped base being formed with a guide block that matches the elongate guide hole and is engaged with a bottom edge of a wall of the elongate guide hole, the frame-shaped base having a press portion that is located below the carrying seat and faces the support portion, the frame-shaped base further having a pair of pivot portions and an accommodating room between the pair of pivot portions, a receiving portion being provided on a bottom of at least one of two sides of the accommodating room adjacent to the pivot portions, the receiving portion being formed with a through hole relative to the anti-slip portion;

a chuck, disposed at one end of the frame-shaped base opposite the accommodating room, the chuck having a head, two sides of the head being respectively formed with clamping surfaces relative to the resting surfaces of the pair of resting blocks, the clamping surfaces being parallel to the resting surfaces;

at least one detent, disposed on the receiving portion, the detent having a detent body that is movable in the through hole, a bottom of the detent body being formed with a locking surface relative to the anti-slip portion;

an eccentric pull member, having a rotating member pivoted to the pair of pivot portions with a pivot rod, an operating portion being formed on one side of the rotating member, at least one of two ends of the eccentric pull member being formed with a first eccentric portion relative to an upper surface of the detent body of the detent, the first eccentric portion being configured to press the detent body to move in the through hole and enabling the locking surface to be in tight contact with the anti-slip portion; and a slider spring, one end of the slider spring being pressed against the support portion of the clamp body and another end of the slider spring being pressed against the press portion of the slider for pushing the clamping surfaces of the chuck to lean against the resting surfaces of the pair of resting blocks normally.

2. The corner clamp of claim 1, wherein the clamp body further has a notch at a position where the elongate guide hole meets the support portion, a pair of engaging gaps are formed at a junction of the notch and the wall of the elongated guide hole, and two sides of a bottom of the guide block of the slider are formed with a pair of engaging portions relative to the engaging gaps.

3. The corner clamp of claim 1, wherein the press portion of the slider is formed with a neck corresponding in width to the elongate guide hole of the clamp body.

4. The corner clamp of claim 1, wherein the included angle between the resting surfaces of the pair of resting blocks of the clamp body is 90 degrees.

5. The corner clamp of claim 1, wherein a curved groove is formed on the receiving portion of the slider, the curved groove is provided with a resilient member at a position separated from the through hole, one end of the detent body of the detent has a pivotal portion mounted on the curved groove for swinging, another end of the detent body of the detent has a push portion that rests on the elastic member, and the elastic member pushes the push portion so that the locking surface is normally away from the anti-slip portion on the slide surface of the clamp body.

6. The corner clamp of claim 5, wherein the non-slip portion on the slide surface of the clamp body is a toothed surface having a plurality of teeth arranged in parallel, and the locking surface of the detent is a toothed surface having teeth corresponding in shape and in space width to the teeth of the anti-slip portion.

7. The corner clamp of claim 1, wherein anti-slip soft rubber pads are provided on the resting surfaces of the resting blocks of the carrying seat of the clamp body and the clamping surfaces on the two sides of the head of the chuck respectively, and outer surfaces of the anti-slip soft rubber pads are defined as the resting surfaces and the clamping surfaces.

8. The corner clamp of claim 1, wherein a protrusion and a recess are provided on the support portion of the clamp body and the press portion of the slider for mounting the slider spring, and the protrusion and the recess are interchangeable with each other.

9. The corner clamp of claim 1, wherein the end of the frame-shaped base of the slider, opposite to the accommodating room, forms a platform portion that is separated by a retaining wall, the retaining wall has a doorway that allows the platform portion to communicate with the accommodating room, a guide part is provided on a surface of the platform portion corresponding to the doorway; the chuck has an extension section extending from one end of the head, the extension section is placed on the surface of the platform portion and inserted into the accommodating room via the doorway, the guide part is accommodated in the extension section so that the chuck is guided by the guide part, enabling the head of the chuck to move close to/or away from the retaining wall on the platform portion, a chunk spring is provided in the extension section, one end of the chuck spring is pressed against the guide part and another end of the chuck spring is pressed against an inner surface of the extension section, thereby pushing the head to approach the retaining wall normally; a second eccentric portion is provided on another side of the rotating member of the eccentric pull member, the second eccentric portion is normally away from one end face of the extension section, and the second eccentric portion is pushed against the end face of the extension section after the eccentric pull member is pulled toward the chuck.

* * * * *